(12) United States Patent
Kludt et al.

(10) Patent No.: US 11,294,367 B2
(45) Date of Patent: Apr. 5, 2022

(54) PREDICTIVE ANALYSIS OF INDUSTRIAL PROCESSES

(71) Applicant: CANVASS ANALYTICS INC., Toronto (CA)

(72) Inventors: Steve Kludt, Oakville (CA); Amol Mane, Toronto (CA)

(73) Assignee: CANVASS ANALYTICS INC., Toronto (CA)

( * ) Notice: Subject to any disclaimer, the term of this patent is extended or adjusted under 35 U.S.C. 154(b) by 452 days.

(21) Appl. No.: 16/230,729

(22) Filed: Dec. 21, 2018

(65) Prior Publication Data
US 2020/0201313 A1 Jun. 25, 2020

(51) Int. Cl.
G05B 23/02 (2006.01)
G06N 20/10 (2019.01)
G06N 3/08 (2006.01)
G06N 5/04 (2006.01)

(52) U.S. Cl.
CPC ......... G05B 23/0283 (2013.01); G06N 3/084 (2013.01); G06N 5/04 (2013.01); G06N 20/10 (2019.01)

(58) Field of Classification Search
CPC .. G05B 23/0283; G05B 13/048; G06N 20/10; G06N 3/084; G06N 5/04; G06N 3/082; G06N 3/0454; G06N 3/0481; G06N 3/0445
See application file for complete search history.

(56) References Cited

U.S. PATENT DOCUMENTS 10,499,857 B1 * 12/2019 Nguyen .................. G06N 3/08
11,034,357 B2 * 6/2021 Lakshmi Narayanan ................... G06K 9/00845
2019/0042867 A1 * 2/2019 Chen .......................... G06K 9/46
2020/0034627 A1 * 1/2020 Zhu ........................ G06K 9/6277
2020/0074318 A1 * 3/2020 Chen ..................... G06N 3/0454
2020/0210767 A1 * 7/2020 Do ............................. G06N 3/08
2021/0056413 A1 * 2/2021 Cheung .................... G06N 3/08
2021/0166785 A1 * 6/2021 Yip ..................... G06K 9/00147
2021/0225511 A1 * 7/2021 Kiraly .................. G06K 9/6292
2021/0236053 A1 * 8/2021 Narayan ................ G16H 50/70

OTHER PUBLICATIONS

Wikipedia: Convolutional Neural Network <https://en.wikipedia.org/w/index.php?title=Convolutional_neural_network&oldid=874233388> version dated Dec. 17, 2018 (Year: 2018).*
Wikipedia: Gated recurrent unit: <https://en.wikipedia.org/w/index.php?title=Gated_recurrent_unit&oldid=870989686> version dated Nov. 28, 2018. (Year: 2018).*
Wu et al. (Deep convolutional neural network model based chemical process fault diagnosis) (Year: 2018).*

* cited by examiner

*Primary Examiner* — Mohammad K Islam
(74) *Attorney, Agent, or Firm* — Jenna L. Wilson; Wilson Lue LLP

(57) ABSTRACT

Disclosed is a computer-implemented method of generating a time-series of data sets for predictive analysis from data comprising input variables and an output variable recorded at sequential time points, the method comprising: dividing the data into a collection of observations, each observation comprising: a subset of sequential time points; associated input variables; and an output variable recorded at a forecasting time point beyond the latest sequential time point of the subset; and using the collection of observations in a convolution neural network to predict the output at the forecasting time point of a streaming data set.

18 Claims, 16 Drawing Sheets

| Time | $x_1$ | $x_2$ | $x_3$ | ... | $x_n$ |
|---|---|---|---|---|---|
| $t_{19}$ | 0.10 | ... | ... | ... | -0.19 |
| $t_{18}$ | 0.12 | ... | ... | ... | -0.20 |
| $t_{17}$ | 0.11 | ... | ... | ... | -0.20 |
| $t_{16}$ | 0.10 | ... | ... | ... | -0.19 |
| $t_{15}$ | 0.12 | ... | ... | ... | -0.20 |
| $t_{14}$ | 0.11 | ... | ... | ... | -0.19 |
| $t_{13}$ | 0.10 | ... | ... | ... | -0.20 |
| $t_{12}$ | 0.09 | ... | ... | ... | -0.19 |
| $t_{11}$ | 0.09 | ... | ... | ... | -0.19 |
| $t_{10}$ | 0.09 | ... | ... | ... | -0.18 |
| $t_9$ | 0.10 | ... | ... | ... | -0.19 |
| $t_8$ | 0.09 | ... | ... | ... | -0.18 |
| $t_7$ | 0.09 | ... | ... | ... | -0.19 |
| $t_6$ | 0.08 | ... | ... | ... | -0.18 |
| $t_5$ | 0.08 | ... | ... | ... | -0.17 |
| $t_4$ | 0.09 | ... | ... | ... | -0.18 |
| $t_3$ | 0.09 | ... | ... | ... | -0.17 |
| $t_2$ | 0.08 | ... | ... | ... | -0.18 |
| $t_1$ | 0.08 | ... | ... | ... | -0.17 |
| $t_0$ | 0.09 | ... | ... | ... | -0.17 |

| Time | Y |
|---|---|
| $t+_{10}$ | 0.45 |

| Relative Time | Actual Time | $x_1$ | $x_2$ | $x_3$ | ... | $x_n$ | Y |
|---|---|---|---|---|---|---|---|
| $t_M$ | 1/1/2017 00:00:00 | 0.11 | ... | ... | ... | -0.20 | 0.23 |
| ... | ... | ... | ... | ... | ... | ... | ... |
| $t_{21}$ | 7/14/2017 23:39:00 | 0.11 | ... | ... | ... | -0.19 | 0.43 |
| $t_{20}$ | 7/14/2017 23:40:00 | 0.11 | ... | ... | ... | -0.20 | 0.42 |
| $t_{19}$ | 7/14/2017 23:41:00 | 0.10 | ... | ... | ... | -0.19 | 0.42 |
| $t_{18}$ | 7/14/2017 23:42:00 | 0.12 | ... | ... | ... | -0.20 | 0.43 |
| $t_{17}$ | 7/14/2017 23:43:00 | 0.11 | ... | ... | ... | -0.20 | 0.43 |
| $t_{16}$ | 7/14/2017 23:44:00 | 0.10 | ... | ... | ... | -0.19 | 0.45 |
| $t_{15}$ | 7/14/2017 23:45:00 | 0.12 | ... | ... | ... | -0.20 | 0.46 |
| $t_{14}$ | 7/14/2017 23:46:00 | 0.11 | ... | ... | ... | -0.19 | 0.45 |
| $t_{13}$ | 7/14/2017 23:47:00 | 0.10 | ... | ... | ... | -0.20 | 0.43 |
| $t_{12}$ | 7/14/2017 23:48:00 | 0.09 | ... | ... | ... | -0.19 | 0.45 |
| $t_{11}$ | 7/14/2017 23:49:00 | 0.09 | ... | ... | ... | -0.19 | 0.46 |
| $t_{10}$ | 7/14/2017 23:50:00 | 0.09 | ... | ... | ... | -0.18 | 0.45 |
| $t_9$ | 7/14/2017 23:51:00 | 0.10 | ... | ... | ... | -0.19 | 0.43 |
| $t_8$ | 7/14/2017 23:52:00 | 0.09 | ... | ... | ... | -0.18 | 0.45 |
| $t_7$ | 7/14/2017 23:53:00 | 0.09 | ... | ... | ... | -0.19 | 0.46 |
| $t_6$ | 7/14/2017 23:54:00 | 0.08 | ... | ... | ... | -0.18 | 0.45 |
| $t_5$ | 7/14/2017 23:55:00 | 0.08 | ... | ... | ... | -0.17 | 0.43 |
| $t_4$ | 7/14/2017 23:56:00 | 0.09 | ... | ... | ... | -0.18 | 0.45 |
| $t_3$ | 7/14/2017 23:57:00 | 0.09 | ... | ... | ... | -0.17 | 0.46 |
| $t_2$ | 7/14/2017 23:58:00 | 0.08 | ... | ... | ... | -0.18 | 0.45 |
| $t_1$ | 7/14/2017 23:59:00 | 0.08 | ... | ... | ... | -0.17 | 0.43 |
| $t_0$ | 7/15/2017 00:00:00 | 0.09 | ... | ... | ... | -0.17 | 0.45 |
| $t_{+1}$ | 7/15/2017 00:01:00 | 0.09 | ... | ... | ... | -0.17 | 0.46 |
| $t_{+2}$ | 7/15/2017 00:02:00 | 0.09 | ... | ... | ... | -0.18 | 0.45 |
| $t_{+3}$ | 7/15/2017 00:03:00 | 0.09 | ... | ... | ... | -0.18 | 0.43 |
| $t_{+4}$ | 7/15/2017 00:04:00 | 0.09 | ... | ... | ... | -0.18 | 0.45 |
| $t_{+5}$ | 7/15/2017 00:05:00 | 0.09 | ... | ... | ... | -0.19 | 0.46 |
| $t_{+6}$ | 7/15/2017 00:06:00 | 0.09 | ... | ... | ... | -0.19 | 0.45 |
| $t_{+7}$ | 7/15/2017 00:07:00 | 0.09 | ... | ... | ... | -0.19 | 0.43 |
| $t_{+8}$ | 7/15/2017 00:08:00 | 0.09 | ... | ... | ... | -0.20 | 0.45 |
| $t_{+9}$ | 7/15/2017 00:09:00 | 0.09 | ... | ... | ... | -0.20 | 0.46 |
| $t_{+10}$ | 7/15/2017 00:10:00 | 0.09 | ... | ... | ... | -0.20 | 0.45 |

FIG. 2

| Time | $x_1$ | $x_2$ | $x_3$ | ... | $x_n$ |
|---|---|---|---|---|---|
| $t_{19}$ | 0.10 | ... | ... | ... | -0.19 |
| $t_{18}$ | 0.12 | ... | ... | ... | -0.20 |
| $t_{17}$ | 0.11 | ... | ... | ... | -0.20 |
| $t_{16}$ | 0.10 | ... | ... | ... | -0.19 |
| $t_{15}$ | 0.12 | ... | ... | ... | -0.20 |
| $t_{14}$ | 0.11 | ... | ... | ... | -0.19 |
| $t_{13}$ | 0.10 | ... | ... | ... | -0.20 |
| $t_{12}$ | 0.09 | ... | ... | ... | -0.19 |
| $t_{11}$ | 0.09 | ... | ... | ... | -0.19 |
| $t_{10}$ | 0.09 | ... | ... | ... | -0.18 |
| $t_9$ | 0.10 | ... | ... | ... | -0.19 |
| $t_8$ | 0.09 | ... | ... | ... | -0.18 |
| $t_7$ | 0.09 | ... | ... | ... | -0.19 |
| $t_6$ | 0.08 | ... | ... | ... | -0.18 |
| $t_5$ | 0.08 | ... | ... | ... | -0.17 |
| $t_4$ | 0.09 | ... | ... | ... | -0.18 |
| $t_3$ | 0.09 | ... | ... | ... | -0.17 |
| $t_2$ | 0.08 | ... | ... | ... | -0.18 |
| $t_1$ | 0.08 | ... | ... | ... | -0.17 |
| $t_0$ | 0.09 | ... | ... | ... | -0.17 |

40

| Time | Y |
|---|---|
| $t+_{10}$ | 0.45 |

| Time | $x_1$ | $x_2$ | $x_3$ | ... | $x_n$ |
|---|---|---|---|---|---|
| $t_{19}$ | 0.10 | ... | ... | ... | -0.19 |
| $t_{18}$ | 0.12 | ... | ... | ... | -0.20 |
| $t_{17}$ | 0.11 | ... | ... | ... | -0.20 |
| $t_{16}$ | 0.10 | ... | ... | ... | -0.19 |
| $t_{15}$ | 0.12 | ... | ... | ... | -0.20 |
| $t_{14}$ | 0.11 | ... | ... | ... | -0.19 |
| $t_{13}$ | 0.10 | ... | ... | ... | -0.20 |
| $t_{12}$ | 0.09 | ... | ... | ... | -0.19 |
| $t_{11}$ | 0.09 | ... | ... | ... | -0.19 |
| $t_{10}$ | 0.09 | ... | ... | ... | -0.18 |
| $t_9$ | 0.10 | ... | ... | ... | -0.19 |
| $t_8$ | 0.09 | ... | ... | ... | -0.18 |
| $t_7$ | 0.09 | ... | ... | ... | -0.19 |
| $t_6$ | 0.08 | ... | ... | ... | -0.18 |
| $t_5$ | 0.08 | ... | ... | ... | -0.17 |
| $t_4$ | 0.09 | ... | ... | ... | -0.18 |
| $t_3$ | 0.09 | ... | ... | ... | -0.17 |
| $t_2$ | 0.08 | ... | ... | ... | -0.18 |
| $t_1$ | 0.08 | ... | ... | ... | -0.17 |
| $t_0$ | 0.09 | ... | ... | ... | -0.17 |

| Time | Y |
|---|---|
| $t+_{10}$ | 0.45 |

FIG. 6

| Time | $x_1$ | $x_2$ | $x_3$ | ... | $x_n$ |
|---|---|---|---|---|---|
| $t_{19}$ | 0.10 | : | : | : | -0.19 |
| $t_{18}$ | 0.12 | : | : | : | -0.20 |
| $t_{17}$ | 0.11 | : | : | : | -0.20 |
| $t_{16}$ | 0.10 | : | : | : | -0.19 |
| $t_{15}$ | 0.12 | : | : | : | -0.20 |
| $t_{14}$ | 0.11 | : | : | : | -0.19 |
| $t_{13}$ | 0.10 | : | : | : | -0.20 |
| $t_{12}$ | 0.09 | : | : | : | -0.19 |
| $t_{11}$ | 0.09 | : | : | : | -0.19 |
| $t_{10}$ | 0.09 | : | : | : | -0.18 |
| $t_9$ | 0.10 | : | : | : | -0.19 |
| $t_8$ | 0.09 | : | : | : | -0.18 |
| $t_7$ | 0.09 | : | : | : | -0.19 |
| $t_6$ | 0.08 | : | : | : | -0.18 |
| $t_5$ | 0.08 | : | : | : | -0.17 |
| $t_4$ | 0.09 | : | : | : | -0.18 |
| $t_3$ | 0.09 | : | : | : | -0.17 |
| $t_2$ | 0.08 | : | : | : | -0.18 |
| $t_1$ | 0.08 | : | : | : | -0.17 |
| $t_0$ | 0.09 | : | : | : | -0.17 | x192 (from $t_{19}$, $t_{18}$, $t_0$ rows) →

| Seq | $x_1$ | $x_2$ | $x_3$ | ... | $x_n$ |
|---|---|---|---|---|---|
| 18 | 0.02 | : | : | : | -0.12 |
| 17 | 0.01 | : | : | : | 0.03 |
| 16 | 0.03 | : | : | : | -0.01 |
| 15 | 0.01 | : | : | : | 0.03 |
| 14 | 0.02 | : | : | : | -0.10 |
| 13 | 0.10 | : | : | : | 0.05 |
| 12 | 0.03 | : | : | : | -0.86 |
| 11 | 0.02 | : | : | : | 0.12 |
| 10 | 0.12 | : | : | : | 0.18 |
| 9 | 0.06 | : | : | : | -0.13 |
| 8 | 0.01 | : | : | : | 1.20 |
| 7 | 0.02 | : | : | : | -1.19 |
| 6 | 0.03 | : | : | : | 0.02 |
| 5 | 0.05 | : | : | : | -0.01 |
| 4 | 0.01 | : | : | : | 0.48 |
| 3 | 0.10 | : | : | : | 0.63 |
| 2 | 0.03 | : | : | : | -0.81 |
| 1 | 0.01 | : | : | : | -0.23 |
| 0 | 0.08 | : | : | : | -0.92 |

PREDICTIVE ANALYSIS OF INDUSTRIAL PROCESSES

TECHNICAL FIELD

The embodiments relate to a method and apparatus for generating time series subsets from raw data, and analysis of these subsets by machine learning for predictive analysis.

BACKGROUND

Complex industrial processes involve many process parameters in real-time. Such temporal data is collected over a period of time and the outcome of the process is also collected.

For example, consider the process of producing electricity from wind through the use of wind turbines. In such a process, there are meteorological, mechanical, and other physical parameters, that have different impacts on the production of electricity.

Another example includes production of pig iron through use of a blast furnace. In such a process, there is a continuous feed of fuel materials into the furnace that are mixed with air to create complex chemical reactions. Measurements of the chemical makeup, along with rate of the input parameters, air flow, and other state parameters are collected in real time during the process. Outcome parameters may include: the chemical makeup of the pig iron produced (quality metrics); the production volume, etc. In such a production, some of the input parameters can have a near immediate impact on the process, while it may take hours to see the impact of other input parameters.

US Pub. No. 2018260697A1 discloses facilitation of machine learning using multi-dimensional time series data. In an embodiment, a system includes a machine learning component and a snapshot component. The latter generates a first sequence of multi-dimensional time series data and a second sequence of multi-dimensional time series data from multi-dimensional time series data associated with at least two different data types generated by a data system over a consecutive period of time. The machine learning component analyzes the first sequence of multi-dimensional time series data and the second sequence of multi-dimensional time series data using a convolutional neural network system to predict an event associated with the multi-dimensional time series data.

US Pub. No. 20180240010A1 discloses a computing device that trains a machine learning network with a training algorithm that is conFIG.d with configuration parameters. The computing device captures a time series of partial accuracy values from the training. Each partial accuracy value is indicative of machine learning network accuracy at an associated training iteration. The computing device inputs the configuration parameters to a feed-forward neural network to generate a representation and inputs the representation to a recurrent neural network. The computing device trains the feed-forward neural network and the recurrent neural network against the partial accuracy values. The computing device optimizes the feed-forward neural network and the recurrent neural network to determine optimized configuration parameters which may minimize training time to achieve a predetermined accuracy level.

US Pub. No. 20170249534 discloses a method for generating time series data sets (from time-series data) for predictive analysis. The method includes the steps of dividing the time-series data into overlapping segments of data that are evenly-sized. An image representing data for each segment, is generated. The time-series data is used to determine a trend associated with each image, and each of the generated images and its associated trend are stored as a data set. In some instances, a pre-trained convolutional neural network is used to transform the image from each stored data set into numerical vectors, which are then stored in association with the data set. These vectors and data sets are then used to predict trends for a new time-series image which has been generated from any time-series data.

US Pub. No. 20150254554A1 discloses an information processing device and learning method that generates a prediction model on time-series data by using neural networks. A prediction model learning unit learns a prediction model including a first neural network, a second neural network, and a third neural network. Subsets obtained by dividing a set that includes the time-series data values as elements are input respectively to the first neural network and a second neural network. An inner product of outputs from the first neural network and the second neural network is input to the third neural network, which outputs a predicted data value.

U.S. Pat. No. 9,336,482B1 discloses methods, systems and apparatus, for predicting likelihoods of conditions being satisfied using recurrent neural networks. Systems are configured to process a temporal sequence comprising a respective input at each of a plurality of time steps. In an embodiment, a system comprises: one or more recurrent neural network layers; one or more logistic regression nodes, wherein each of the logistic regression nodes corresponds to a respective condition from a predetermined set of conditions, and wherein each of the logistic regression nodes is configured to, for each of the plurality of time steps: receive the network internal state for the time step; and process the network internal state for the time step in accordance with current values of a set of parameters of the logistic regression node to generate a future condition score for the corresponding condition for the time step.

SUMMARY

Historical data (i.e. historical process parameters and historical outcomes) can be used to predict future behavior of a complex industrial process using current process parameters. This leads to understanding how actions that have being undertaken currently and recently, impact future behavior of the process.

In an embodiment, there is provided a method to forecast behavior of complex industrial processes. For example, what will be the state of production in a future time frame? Or, will a process fail?

In one aspect, a computer-implemented method of generating a time-series of data sets for predictive analysis from data comprising input variables and an output variable recorded at sequential time points, the method comprising: dividing the data into a collection of observations, each observation comprising: a subset of sequential time points; associated input variables; and an output variable recorded at a forecasting time point beyond the latest sequential time point of the subset; and using the collection of observations in a convolution neural network to predict the output at the forecasting time point of a streaming data set.

In another aspect, a non-transitory computer-readable storage medium including a computer program which, when run on a computer, causes the computer to carry out the method described above.

In some embodiments, the convolutional neural network comprises a first convolutional layer, followed by one or more inception-module layers, followed by a recurrent layer and terminating with a dense layer, wherein each inception-module layer comprises an inception layer followed by a merging layer and a pooling layer.

In some embodiments, each inception layer comprises a plurality convolution layers and one or more merging layers.

In some embodiments, the plurality of convolution layers are in series, in parallel or a combination thereof.

In some embodiments, the collection of observations is used to train the neural network; the streaming data set is divided into a second collection of observations, each observation of the second collection comprising a subset of sequential time points and associated input variables; the second collection of observations is input into the trained neural network; and the trained neural network outputs a predicted outcome of the streaming data at the forecasting time point beyond the latest sequential time point of the subset.

In another aspect, a data processing apparatus configured to generate a time-series of data sets for predictive analysis from data comprising input variables and an output variable recorded at sequential time points, the apparatus comprising: data preparation means operable for dividing the data into a collection of observations, each observation comprising: a subset of sequential time points; associated input variables; and an output variable recorded at a forecasting time point beyond the latest sequential time point of the subset; and output prediction means for using the collection of observations in a convolution neural network to predict the output at the forecasting time point of a streaming data set.

In some embodiments, the convolutional neural network comprises a first convolutional layer, followed by one or more inception-module layers, followed by a recurrent layer and terminating with a dense layer, wherein each inception-module layer comprises an inception layer followed by a merging layer and a pooling layer.

In some embodiments, each inception layer comprises a plurality convolution layers and one or more merging layers.

In some embodiments, the plurality of convolution layers are in series, in parallel or a combination thereof.

In some embodiments, the collection of observations is used to train the neural network; the streaming data set is divided into a second collection of observations, each observation of the second collection comprising a subset of sequential time points and associated input variables; the second collection of observations is input into the trained neural network; and the trained neural network outputs a predicted outcome of the streaming data at the forecasting time point beyond the latest sequential time point of the subset.

In yet another aspect, a system for adjustment of an industrial process, the system comprising: a data processing apparatus configured to generate a time-series of data sets for predictive analysis from data of the industrial process, the data comprising input variables and an output variable recorded at sequential time points, wherein: the apparatus comprises: data preparation means operable for dividing the data into a collection of observations, each observation comprising: a subset of sequential time points; associated input variables; and an output variable recorded at a forecasting time point beyond the latest sequential time point of the subset; and output prediction means for using the collection of observations in a convolution neural network to predict the output at the forecasting time point of a streaming data set; and the industrial process is adjusted in relation the output at the forecasting time point of the streaming data set.

In some embodiments, the convolutional neural network comprises a first convolutional layer, followed by one or more inception-module layers, followed by a recurrent layer and terminating with a dense layer, wherein each inception-module layer comprises an inception layer followed by a merging layer and a pooling layer.

In some embodiments, each inception layer comprises a plurality convolution layers and one or more merging layers.

In some embodiments, the plurality of convolution layers are in series, in parallel or a combination thereof.

In some embodiments, the collection of observations is used to train the neural network; the streaming data set is divided into a second collection of observations, each observation of the second collection comprising a subset of sequential time points and associated input variables; the second collection of observations is input into the trained neural network; and the trained neural network outputs a predicted outcome of the streaming data at the forecasting time point beyond the latest sequential time point of the subset.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF DRAWINGS

Embodiments may be more completely understood in consideration of the following detailed description of various embodiments in connection with the accompanying drawings, in which:

FIG. 2 illustrates an example of a dataset of an industrial process.

FIG. 3 is an example of a single observation from the dataset shown in FIG. 2.

FIG. 6 illustrates a single observation prior to analysis by the convolutional layer shown in FIG. 5A.

FIG. 7 illustrates application of the Convolutional Layer of the embodiment shown in FIG. 5B to the observation shown in FIG. 6.

FIG. 9 illustrates an example of application of a smaller convolution, followed by application of a larger convolution.

DETAILED DESCRIPTION

Figure 1:
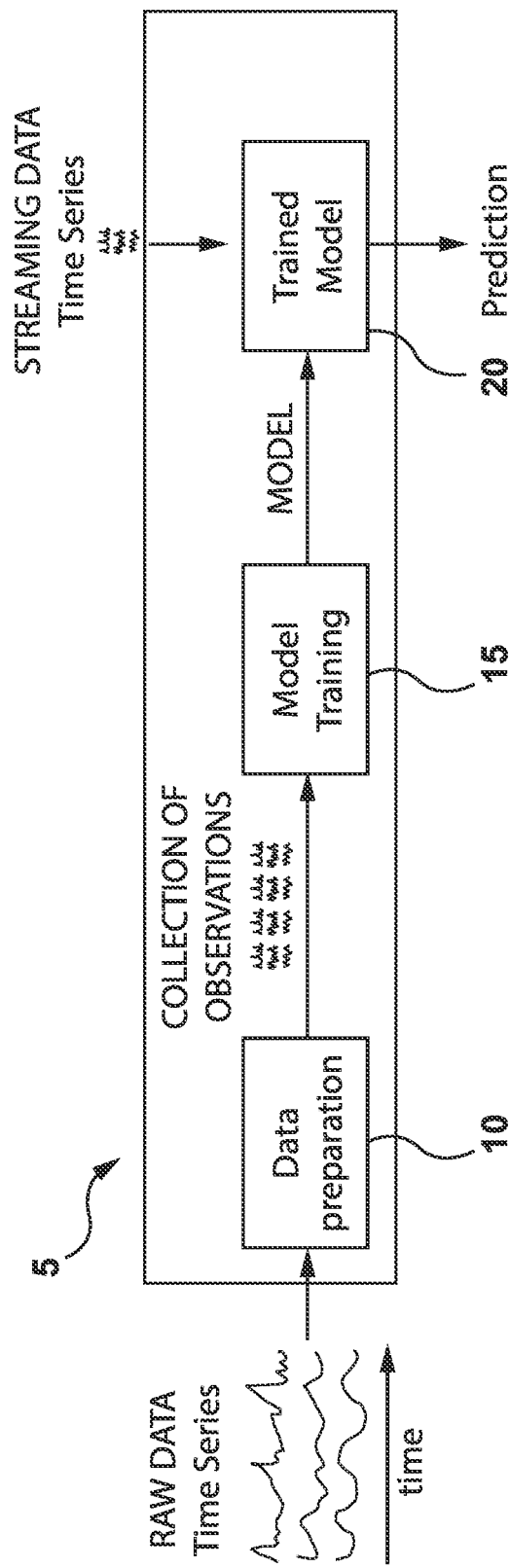
FIG. 1 illustrates an embodiment of an apparatus embodiment.

FIG. 1 shows an embodiment of a data processing apparatus 5 that implements a time series prediction system based on machine learning methods. As shown in FIG. 1, the apparatus 5 may include a data preparation module 10, a model training module 15 that results in a trained model 20 which provides a prediction.

In accordance with an embodiment, a data preparation module 10 (data preparation means) is operable to carry out a process of converting raw time series data into a collection of observations that are used to train a machine learning model via a model training module 15. The trained model 20 may then analyze time series streaming data to provide a prediction.

FIG. 2 illustrates an example of a dataset of an industrial process (note: the numerical values shown in FIGS. 2-4, 6, 7, 9, 10 and 12-14 are just for illustrative purposes). The 'n' features $x_1, x_2, \ldots x_n$ are measured at 1-minute intervals, as shown by the column "Actual Time", starting at midnight on Jan. 1, 2017. These features, $x_1, x_2, \ldots x_n$, may include observational or state features that are not directly controllable (e.g. temperature, humidity, ambient air pressure, etc.); and process control features that may be controlled (e.g. valve status, gas rate, etc.). An output parameter, 'Y', is also measured at the same 1-minute intervals. The first measurement occurs at midnight on Jan. 1, 2017, at which time $x_1=0.11, \ldots, x_n=-0.20$; and y=0.23.

In FIG. 2, the left-most column, titled "Relative Time", indexes the actual time points. The relative time point "$t_0$" corresponds to a particular point in the time series. In general, to may correspond to the first actual time point, the last point, or some point in between. It is used as an anchor to depict how all other observations are calculated relative to that one point in time. In FIG. 2, $t_0$ corresponds to midnight on Jul. 15, 2017. Time points that precede to are denoted with a negative index, i.e. $t_{-1}, t_{-2}, \ldots t_{-M}$. Time points that follow to are denoted with a positive index. For example, the relative time point $t_{+10}$ corresponds to 10 minutes after midnight.

While FIG. 2 shows actual time points 1-minute apart (i.e. a time resolution of 1 minute), it is possible to have data points at other regular time intervals. For example, actual time points may be 5-minutes apart. In such a case, sequential relative time points $t_1, t_2, t_3$, etc., represent 5-minute intervals; $t_{+10}$ would then correspond to 50 minutes after to.

In preparation to use a convolutional neural network, the raw data is partitioned into a set of observations (described below) so that subsamples of the raw data may be used for forecasting.

As an example, with reference to FIG. 2, suppose the goal is to forecast production of an output parameter (y) 10 minutes into the future, based on most recent data. The raw data may be partitioned into subsamples. For example, observations (i.e. the measured values of $x_1, \ldots, x_n$) over a 20-minute interval from $t_{-19}$ (corresponding to Jul. 14, 2017 at 11:41 pm) to $t_0$ (corresponding to Jul. 15, 2017 at midnight) can be used. An initial input for the predicted y value can be the y-value observed at 10 minutes after midnight, Jul. 15, 2017 (i.e. y=0.45 at $t_{+10}$). Alternatively, the measured values of $x_1, \ldots, x_n$ over the 20-minute interval $t_{-1}, t_{-2}, \ldots t_{-20}$ and the y value at $t_{+9}$ (which corresponds to 12:09 am) may also be used. Similarly, measured values of $x_1, \ldots, x_n$ over the 20-minute interval $t_{-2}, t_{-2}, \ldots t_{-21}$ and the y value at $t_{+8}$ (which corresponds to 12:08 am) can be used; and so on. These collections of observations and corresponding y values may then be used as input for a convolutional neural network.

It is understood that a subsample can have a historical time interval of more or less than 20 time points (i.e. 20 minutes in the case of FIG. 2, where each time point is 1 minute apart). Similarly, the predicted output parameter (y) may be for any time in the future (i.e. not necessarily 10 minutes).

Figure 4:
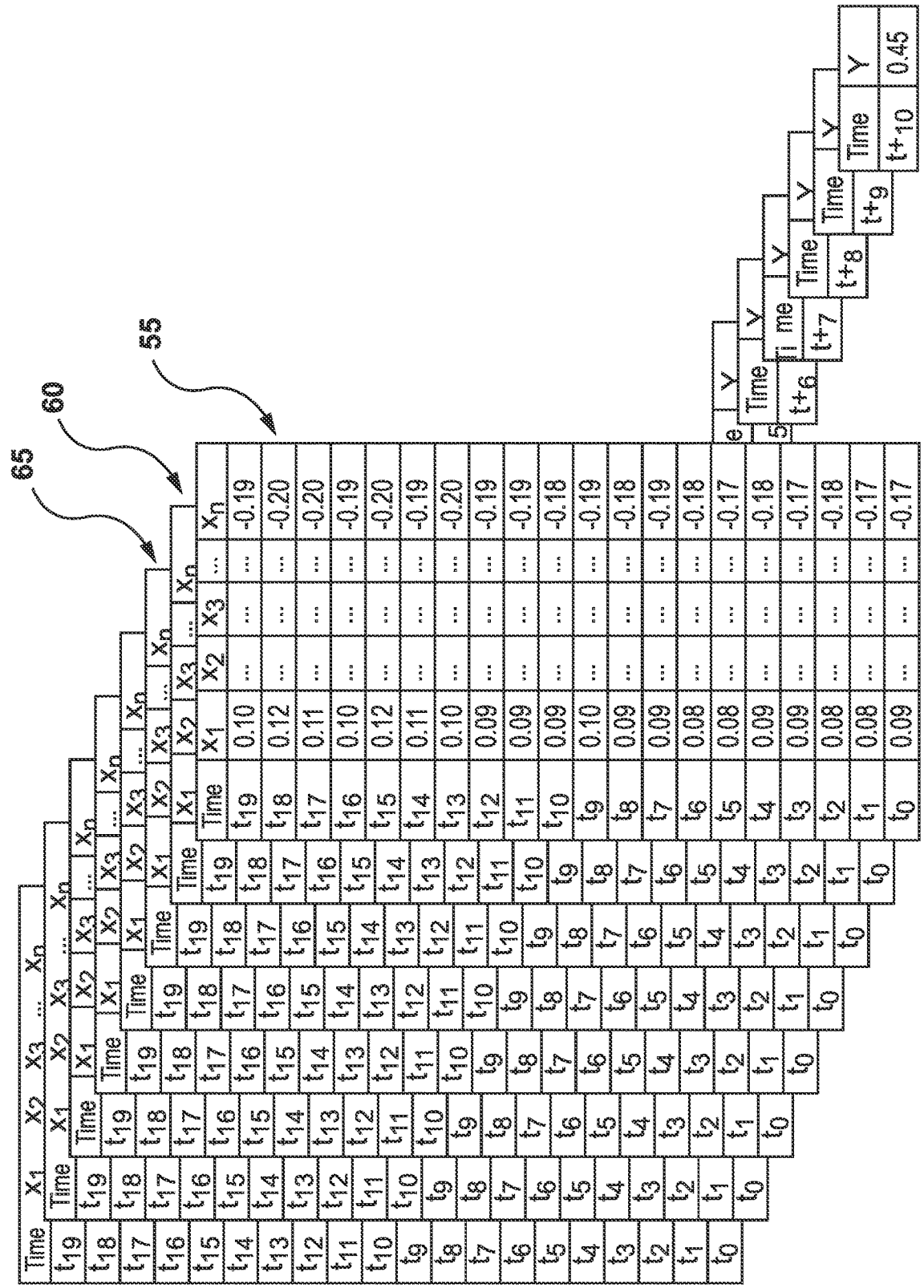
FIG. 4 illustrates a collection of observations from the dataset shown in FIG. 2.

For example, FIG. 3 provides an example of single observation, while FIG. 4 provides an example of a collection of observations, based on raw data from the process shown in FIG. 2. Each figure is explained below.

FIG. 3 illustrates a subsample (40) (i.e. single observation) of measured values of $x_1, \ldots x_n$ over a memory of 20 time points ($t_{-19}, t_{-18}, \ldots, t_0$). Since the goal is to predict 'y' 10 minutes into the future, an initial forecast (50) for the dependent variable y is based on the measured value of y at the actual time corresponding to $t_{+10}$. It should be noted that the memory length (i.e. 20 time intervals) is simply an example of a memory length that can be used. Memory lengths may be less or more. Similarly, the future time point of 10-time steps is also an example; other future time steps may be used. The observation (40) is a matrix of dimension 20×n (i.e. 20 rows by n columns), containing the measured values of $x_1, \ldots x_n$ over a memory of 20 time points. In general, if 'h' time points are used for the observation, then a single observation will be a matrix having a dimension of h×n, containing the measured values of $x_1, \ldots x_n$ over a memory of 'h' time points.

FIG. 4 illustrates a collection of subsamples (i.e. a collection of observations) of measured values of $x_1, \ldots x_n$ over a memory of 20 time points. The difference between each successive cascading table, is the particular memory sampled. The front-most observation (55) corresponds to the single observation shown in FIG. 3. The next observation (60), behind the first, corresponds to time points $t_{-1}, t_{-2}, \ldots t_{-20}$ and the y value at $t_{+9}$; the next observation (65), behind the second, corresponds to time points $t_{-2}, t_{-3}, \ldots t_{-21}$ and they value at $t_{+8}$; and so on, until all of the raw data is sampled from $t_0$ to $t_{-m}$, where $t_{-m}$ is the final data point.

In general, a collection of observations results in a 3-dimensional matrix of dimensions [m−((h−1)+f), h, n] for the independent variables and a vector of length [m−(h−1)+f] for an output variable (i.e predicted values), where:
m=Number of time points in the original data
h=the history (or memory) used for each observation
f=the forecasting horizon used for each observation
n=Number of independent variables In the examples illustrated in FIGS. 2-4, h=20 and f=10. For actual industrial processes, a small dataset can comprise about 30,000 observations.

In the examples shown in FIG. 2-4, a history length may be 20 (i.e. based on the 20 time points $t_0, t_{-1}, \ldots t_{-19}$), which can depend on the frequency of data and the process itself. As explained above, the history length may be less than 20 time points, or more than 20 time points. As such, the memory may be a parameter that can be passed into a pipeline, resulting in transformation of raw data (from the original continuous time series data) into observations with an amount of memory specified.

In one embodiment of the method, a deep convolutional neural network can be used with several inception layers, followed by a recurrent layer and a fully connected dense layer for extracting deep features of the three-dimensional matrices prepared as described above. As an example, high accuracy is obtained based on a relatively small dataset comprising roughly 30,000 observations.

Figure 5A:
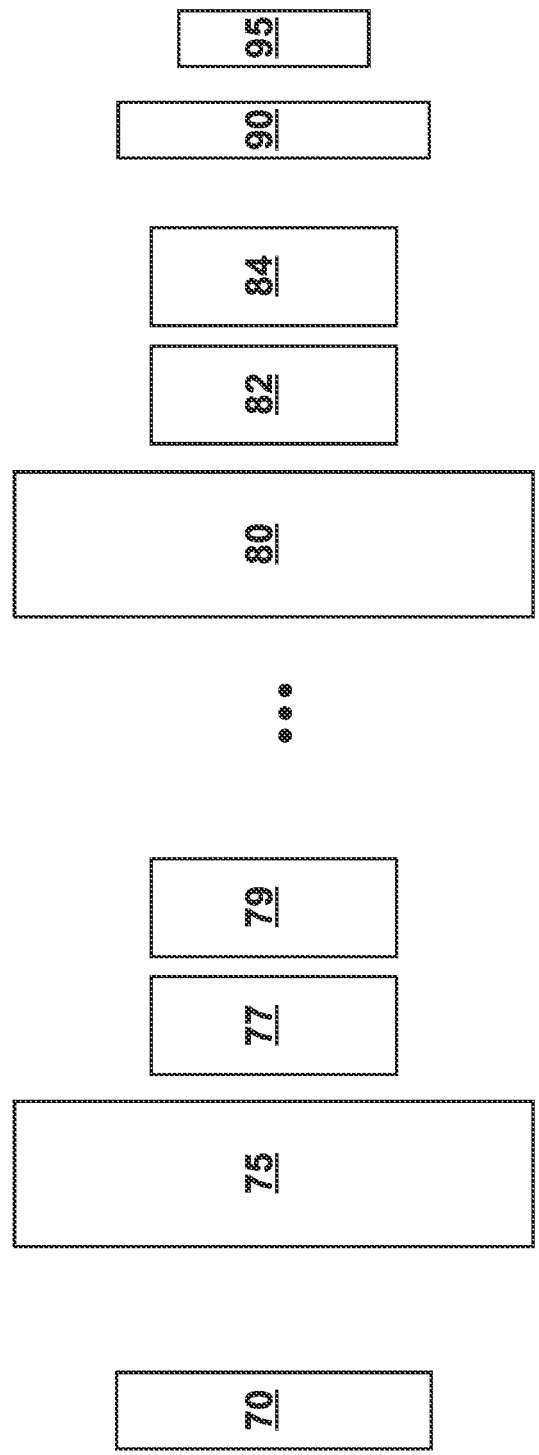
FIG. 5A illustrates an embodiment of network architecture.

FIG. 5A illustrates an example of network architecture that may be used in an embodiment of the method. An initial convolution layer (70) is followed by a first inception layer (75), which is followed by a merge (77) and average pooling (79). The sequence of an inception layer, merging and average pooling may be repeated, as shown by a further inception layer (80), merge (82) and average pooling (84). The network is completed by a Recurrent layer (90) and a dense layer (95).

Inception layers provide an opportunity to look over the data at different sequence lengths to provide better (learned) representations of the data than what the original data provides. Certain patterns can surface over different time periods, such as steady state for a short time, steady state for a longer time, gradual increase, rapid increase, etc.

Figure 5B:
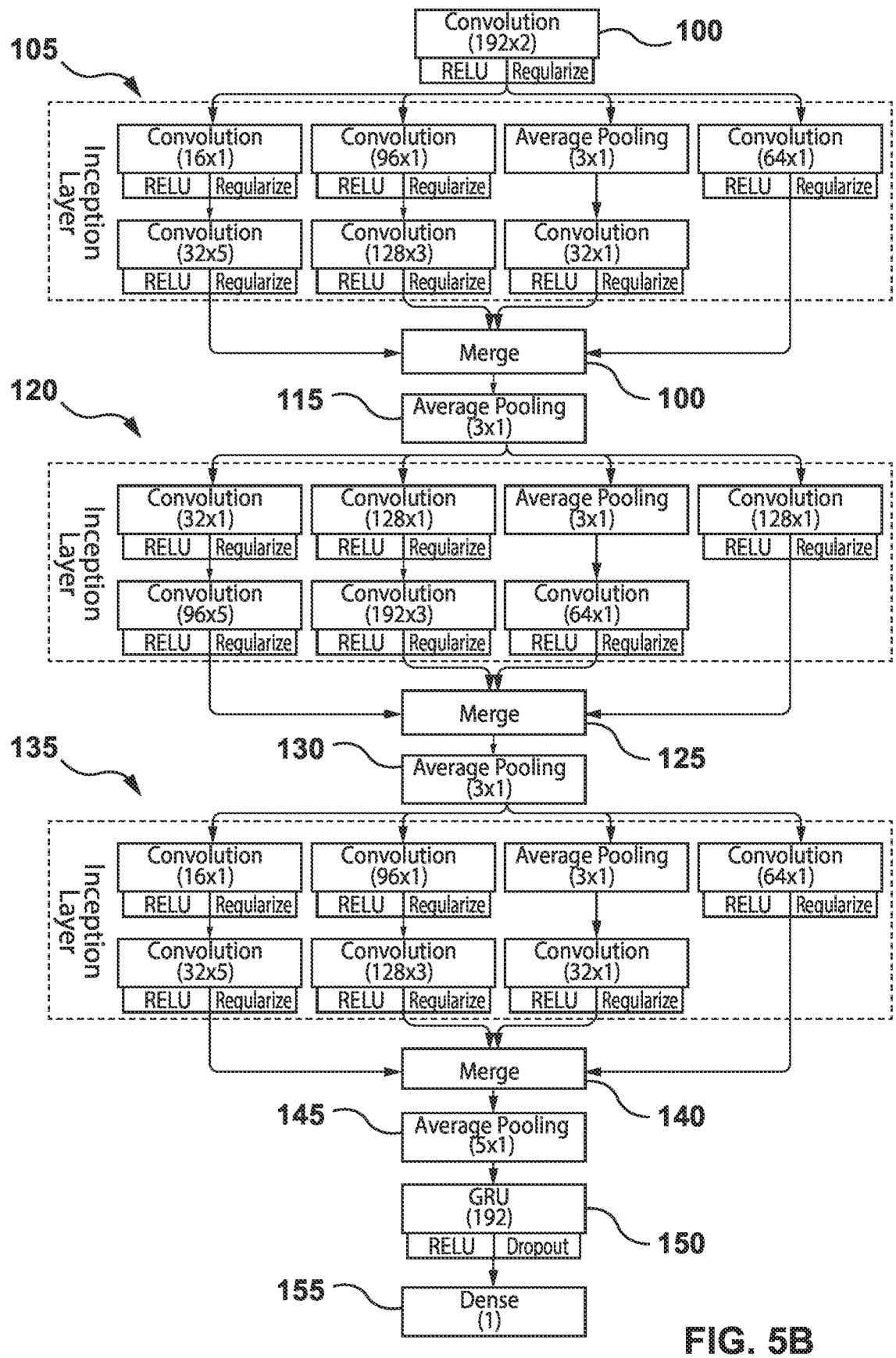
FIG. 5B illustrates another embodiment of network architecture.

FIG. 5B illustrates an example of network architecture that may be used in an embodiment of the method. An initial convolution (100) is followed by a first inception layer (105), which is followed by a merge (110) and average pooling (115); this is followed by a second inception layer (120), which is followed by a merge (125) and average pooling (130); this is followed by a third inception layer (135), which is followed by a merge (140) and average pooling (145). This third series (of inception, merging and pooling) is followed by a Gated Recurrent Unit (GRU) (150) and a dense layer (155).

The initial convolution layer (100) may include an activation function (102) and regularization (104). While RELU is shown as the activation function (102), it is understood that any suitable activation function may be use.

The first inception layer (105) comprises a plurality of convolutions and average pooling. Each convolution may have an activation function and regularization. While RELU is shown as the activation function for each convolution in the first inception layer, it is understood that any suitable activation function may be use. Furthermore, while five convolutions are illustrated in the first inception layers, any number of convolutions may be used. Similar types of variations also apply to the second (120) and third (135) inception layers. While a total of six convolutions are shown within each inception layer, it is possible to use fewer or more convolutions within each inception layer.

While three inception layers are shown in FIG. 5B, it is understood that fewer, or more, inception layers may be used. In an embodiment where a particular data set was used it was found that model performance increased going from 2 to 3 inception layers. However, there was minimal or no increase in model performance going from 3 to 4 inception layers. Furthermore, an optimum number of inception layers depends on the nature of the data set used (i.e. process analyzed). Therefore, for one type of industrial process, 3 inception layers may be optimal, whereas for different type of industrial process, fewer or more (than 3) inception layers are optimal.

While a GRU (150) is shown in FIG. 5B, it is understood that the GRU (150) may be replaced by a form of a Recurrent Layer, a Recurrent Neural Network (RNN) or a Long Short-Term Memory (LSTM). This is what transforms three-dimensional data (comprising observation, sequence and features) into two dimensions (comprising observation and features). A two-dimensional form is used for the final dense layer (155). Further details of sections shown in FIG. 5B are discussed below.

In an embodiment, the network may be trained by using a collection of single observations. Diagrams below explain how the network can operate using a single observation, which is then repeated for all observations. Network weights are updated using back propagation.

In general, a series of observations is analyzed by the Network, one observation at a time. FIG. 6 illustrates a single observation that is to be analyzed by, for example, the Network of FIG. 5B. In general, the input has the dimensions [o, h, n], where:
o=number of observations;
h=number of memory time points; and
n=number of independent variables In FIG. 6, o=1; h=20; and n is the total number of independent variables $x_1, x_2, \ldots x_n$.

Input Convolutional Layer

In the embodiment shown in FIG. 5B, the first layer is a Convolution Layer, which may have the following configuration:

| Convolution Configuration | |
|---|---|
| Convolutions | 192 |
| Kernel Size | 2 |
| Stride | 1 |
| Regularization | Tuned |
| Activation | RELU |

The convolutions and kernel size may be tuned to different values.

FIG. 7 illustrates application of the first convolution layer shown in FIG. 5B to the observation shown in FIG. 6. The table on the left side of FIG. 7 is the table shown in FIG. 6. FIG. 7 illustrates how a 1-dimensional convolution (with Kernel Size of 2, Stride of 1) operates over input data to produce 192 representations (or convolutions) of the data.

First Inception Layer

Figure 8:
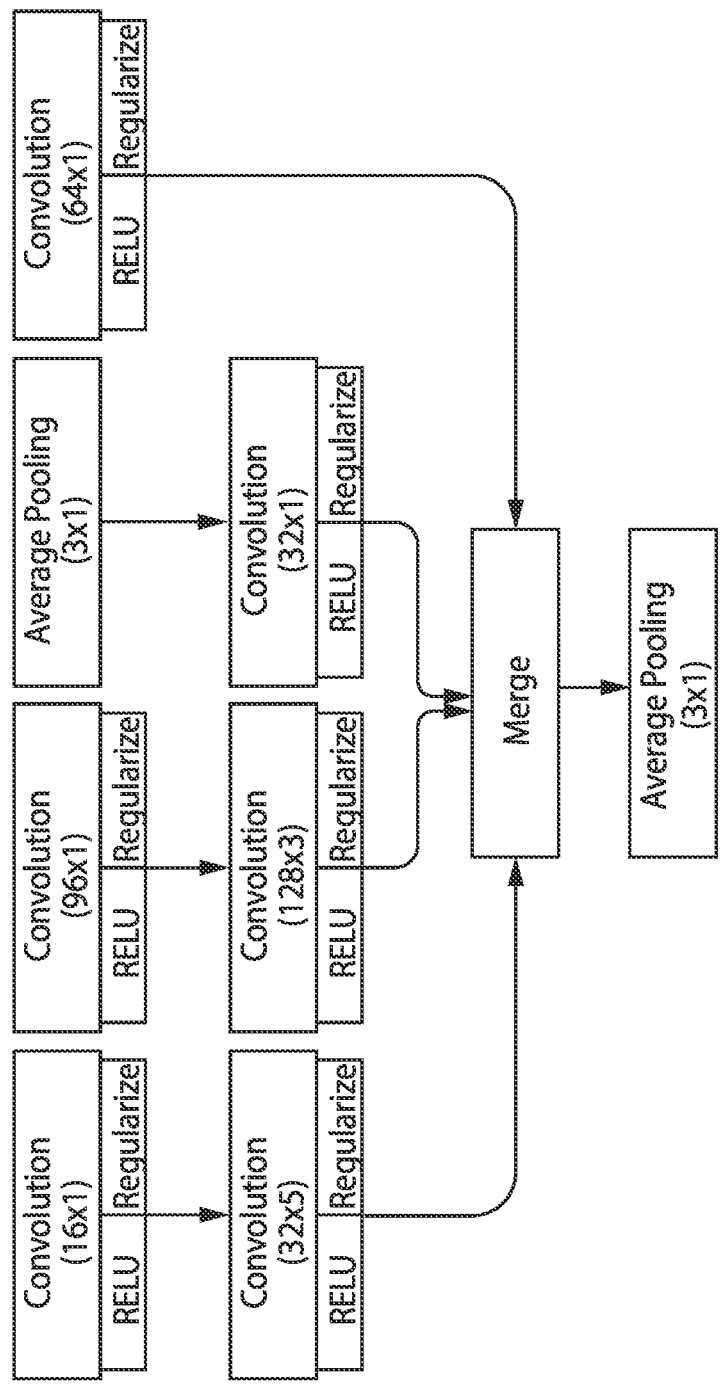
FIG. 8 illustrates the first inception layer of the embodiment shown in FIG. 5B.

FIG. 8 illustrates the first inception layer of the embodiment shown in FIG. 5B. In this layer, different sequence lengths (i.e. time steps) are tested in the convolutions, in order to perceive patterns that appear over different lengths of sequences (time steps). As an example, testing may be done over the following four different sequence lengths:
1. Convolution over 5 sequences (Kernel Size=5)
2. Convolution over 3 sequences (Kernel Size=3)
3. Convolution over 1 sequence (Kernel Size=1)
4. Average Pool over 3 sequences>Convolution over 1 sequence (Kernel Size=1)

Figure 9:
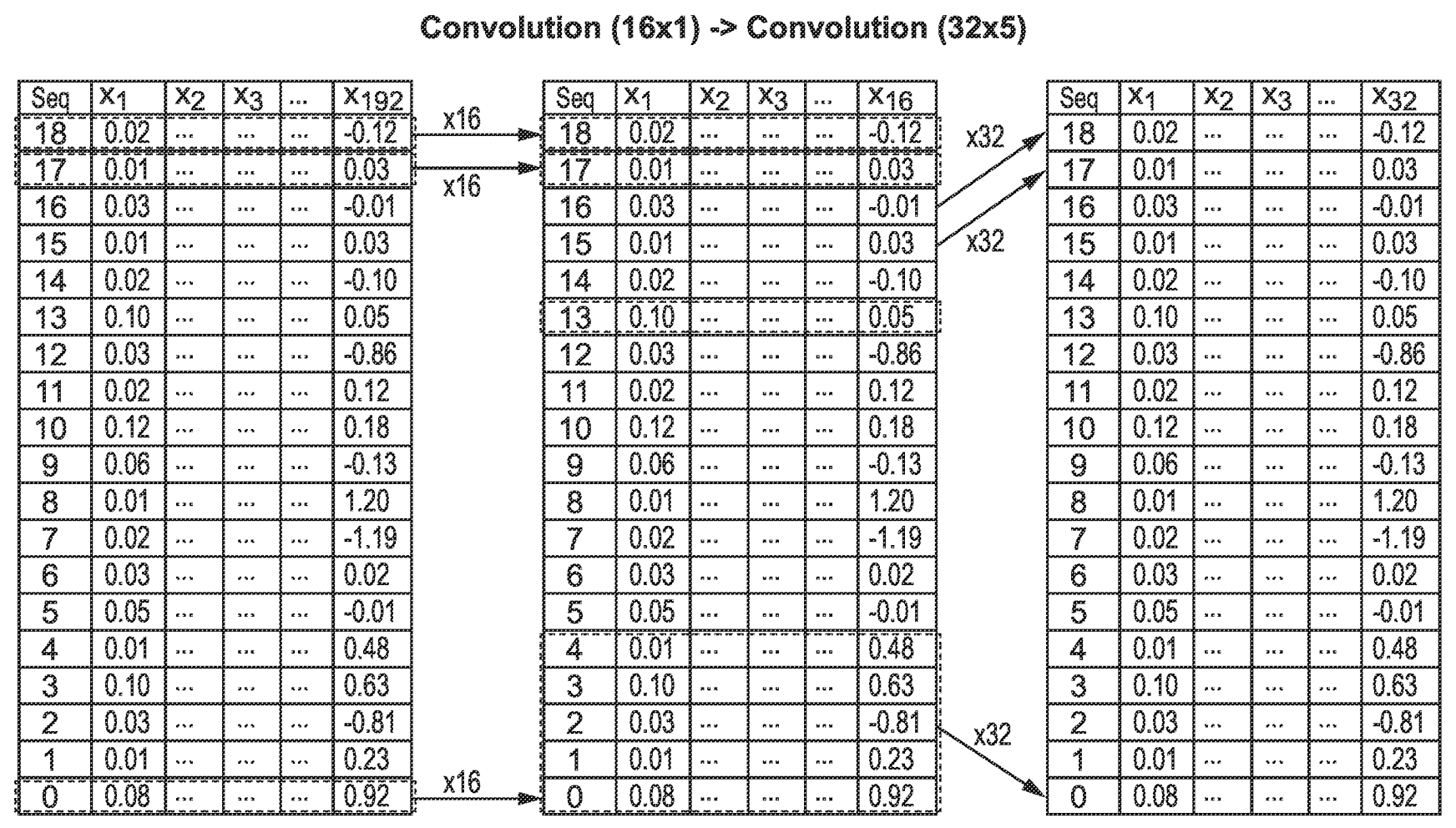

Such a procedure provides for representations over different sequences (time steps). Since larger convolutions with large kernel sizes take a longer time to process, the data is first run through a smaller convolution to reduce the number of features prior to going into the larger convolution. Such an example is shown in FIG. 9.

Referring back to FIG. 5B, once the data has proceeded through each of the convolutional layers within the first inception layer (105), the outputs are merged together (110) to provide representation of the data that is of the input sequence length by 256 features (i.e. the sum of each of the four convolutions through which the observations are processed). The total of '256' features is obtained by adding '32'+'128'+'32'+'64'.

Figures 10, 11:
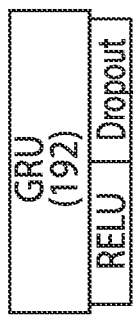
FIG. 10 illustrates an example of application of an Average Pooling Layer (3×1).
FIG. 11 illustrates an example of an RNN (GRU) layer.
Figure 12:
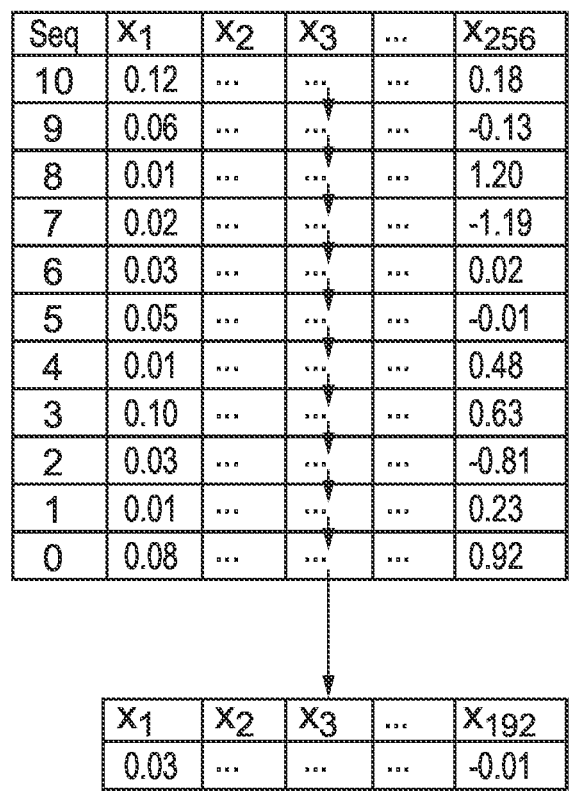
FIG. 12 illustrates an example of operations of an RNN (GRU) layer.

Next, the data may be passed through an average pooling (115) where the data is averaged along a sequence axis to reduce the data for subsequent layers in the network. An example of an average pooling layer (3×1) is shown in FIG. 10.

Further Inception Layers

FIG. 5B illustrates a second inception layer (120), which is similar to the first inception layer (105). One difference between the two inception layers is an increase in the size of kernels (within the inception layer). Such a variation permits the network to extract additional information about the data with minimal additional training time since the size of the data has decreased (from that of the original input data) by first passing through the first inception layer (105).

Once the data has proceeded through each of the convolutional layers within the second inception layer (120), the outputs are merged together (125) to provide representation of the data that is of the input sequence length by 480 features (i.e. the sum of each of the four convolutions through which the observations are processed). The total of '480' features is obtained by adding '96+'192+'64'+'128'.

FIG. 5B also illustrates a third inception layer (135) that is structured exactly like the first inception layer (105). However, the third layer (135) can pick up subtle changes that are input to the next layer. It should be understood that the third inception layer (135) need not be structure exactly like the first inception layer (105).

Once the data has proceeded through each of the convolutional layers within the third inception layer (135), the outputs are merged together (140) to provide representation of the data that is of the input sequence length by 256 features (i.e. the sum of each of the four convolutions through which the observations are processed). The total of '256' features is obtained by adding '32'+'128'+'32'+'64'.

Recurrent Neural Network (RAIN) Layer

After completing the three inception layers (105), (120), (135) and the final average pooling (145), the dimension of the data will be [o, h−8, 256]. RNN's have proven very effective in understanding sequences of data (particularly in the Natural Language Processing domain). The RNN layer (150) operates on the remaining sequences (h−8) after the inception layers (105), (120), (135) have learned the best representation of the features. The RNN layer (150) will produce a resulting matrix having a dimension of [o, 192] (where '192' is the number of nodes in the RNN). An example of an RNN (GRU) layer is shown in FIG. 11, with its operations shown in FIG. 12.

At this point (through the network), the network has learned a way to represent the information contained in a single observation of dimension [h, n] into a compressed vector of length 192 that contains portions of information that are most important to understand an output value (y).

Dense/Output Layer

Figure 13:
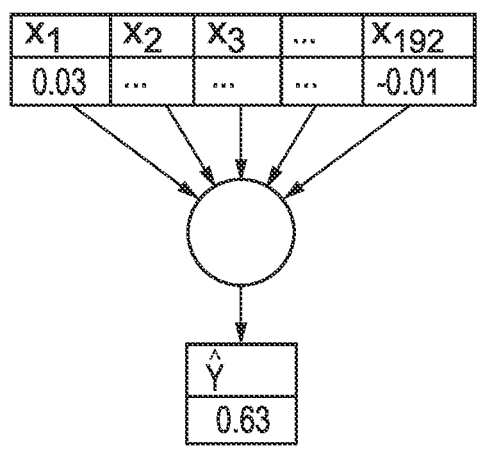
FIG. 13 illustrates an example of a dense layer.

The network concludes with a dense layer (155) with one neuron, which will associate the [o, 192] representation with the prediction ($\hat{Y}$). FIG. 13 illustrates an example thereof.

Variations

Variations may be made to the network. Non-limiting examples of variations are discussed below.

An activation function may be added to one or more layers within the network, to assist in drawing out non-linear relationships. For example, a tanh, sigmoid, ReLU, etc. may be used. The type of activation function can be varied based on the data. In one embodiment, an activation function is added to every layer within the network.

Regularization may be added to one or more layers within the network. Since networks used in embodiments of this method are deep, regularization is used to prevent the network from overfitting. This is a parameter that is tuned with cross-validation. In an embodiment, Regularization is added to every layer within the network.

Hyperparameter Tuning

Hyperparameter tuning may be used when training a network. A plurality many of parameters may be tuned, including Learning Rate, Decay, Momentum, L2 Regularization Rate, L1 Regularization Rate, Dropout Rate and Type of Activation Layer. In addition, a number of optimizers may be used, such as (but not limited to) RMSProp, Adam, and SGD.

Example

An embodiment of the method includes application to the manufacture of steel which includes a blast furnace to produce pig iron (i.e. an intermediate product, also known as crude iron, which is first obtained from the blast furnace) from fuels, ores and limestones. A steel manufacturer may have been running this process for many years and have thus collected data about hundreds of process variables that affect the production of pig iron. With regards to the operation of the blast furnace, an operator tries to balance two output variables: 1) the volume of productions (i.e., tons of pig iron); and 2) quality of the pig iron. As an operator increases production volume of the pig iron, the quality decreases; on the other hand, as the operator increases the quality, production must be slowed down. An operator may change several parameters of the process (e.g. natural gas rate, tuyere energy level. etc.) to affect the outcome. Even though the operator may have a high-level understanding of how certain parameters influence the process, it is difficult to know exactly how changing a given parameter will affect a current state of the blast furnace. This often results in an operator constantly oscillating around optimal values—for example, if the quality metric is too high (resulting in a low production metric), the operator makes a change to one or more process variables to reduce the quality metric while increasing the production metric. At the next reading, the quality metric is too low, and so the operator makes a change in the process variables to correct this shortcoming. This cycle continues, resulting in inconstant quality and production.

As an embodiment of the method, historical data of the process is collected over a time frame. Non-limiting examples of process variables include ambient meteorological conditions, chemical makeup of input fuels, input rates, control parameters, operational parameters, temperatures at different points of the process, chemical makeup of the outputs, etc. In one example, about 9 months' worth of data was collected. The data was prepared as a series of observations using 2 hours of prior data (i.e. a memory span corresponding to 2 hours) and the quality metric 1 hour beyond (i.e. a forecasting span of 1 hour). The collection of observations was then used to train a machine learning model; the trained model was used to predict the quality metric in 1 hour using the last two hours' worth of data. This data went through the exact same process to predict the production metric in 1 hour, based on the last two hours' worth of data. The method demonstrates that if an operator can obtain the last two hours' worth of data (i.e. the hundreds of process variables that are collected now through two hours ago), then the method can tell the operator where both the quality and production metrics will be in 1 hour. An operator is thus able to balance the adjustments made in order to optimize the quality and production based on where these metrics are now, and where they are going to be in 1 hour. By implementing this method, the operator is able to produce a higher volume of pig iron that has a more consistent quality metric.

Figure 14:
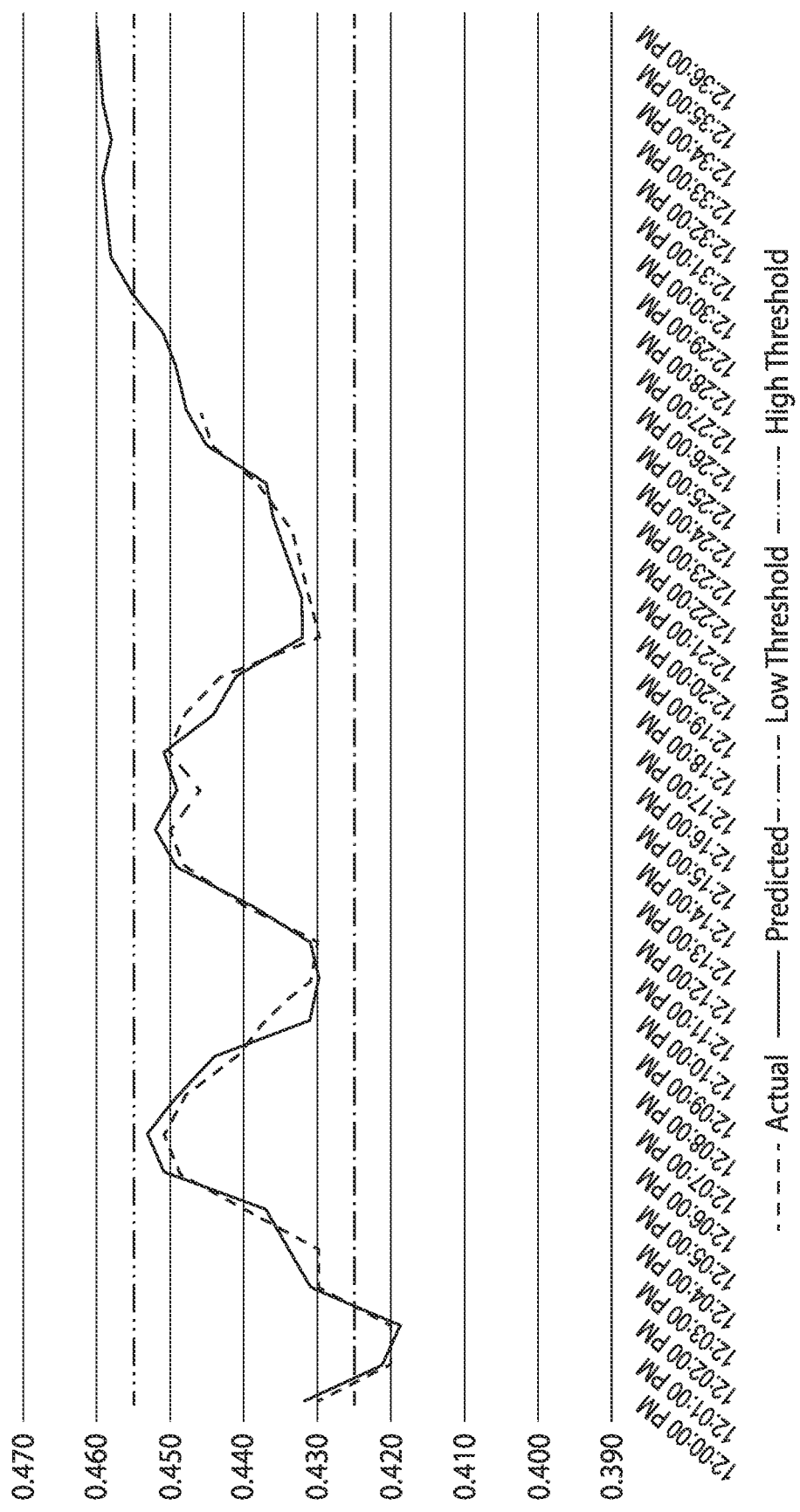
FIG. 14 illustrates an example of predicted outcomes relative to actual outcomes for an industrial process.

FIG. 14 illustrates predicted versus actual outcomes for a pig iron process (note: the numerical values shown in FIG. 14 are just for illustrative purposes). The predicted outcomes are based on a series of observations, each observation based on 20-minute histories (comprising 20 time points) and a 10-minute forecast. In. FIG. 14, the Y-axis represent a quality metric of the pig-iron.

According to FIG. 14, the predicted output at any given time point is based on actual data (process variables and actual output) over twenty-minute intervals with an actual output value 10 minutes after the last time point of the twenty-minute interval. For example, the predicted output at 12:26 pm, is based on the actual data (process variables and actual output) over twenty-minute intervals, up to, and including the twenty-minute interval 11:56 pm-12:16 pm. Similarly, actual data up to 12:26 pm can be used to predict output up until 12:36 pm. FIG. 14 indicates that the output will go beyond a high threshold value of 0.455 at around 12:30 pm, and remain above the high threshold value, if no changes are made to the process.

Embodiments of the present method can be applied to any time series prediction problem, examples of which are mentioned below (but are not limited thereto).

For example, in addition to an iron manufacturing process, the present method may be applied to other industrial processes such as processes within a paper mill (e.g. digestor process, evaporator process, screening process). This may also be applied to, for example (but not limited to) fermentation processes, energy demand or generation, water treatment, cooling demand, turbine or engine efficiency, food production or quality.

Figure 15:
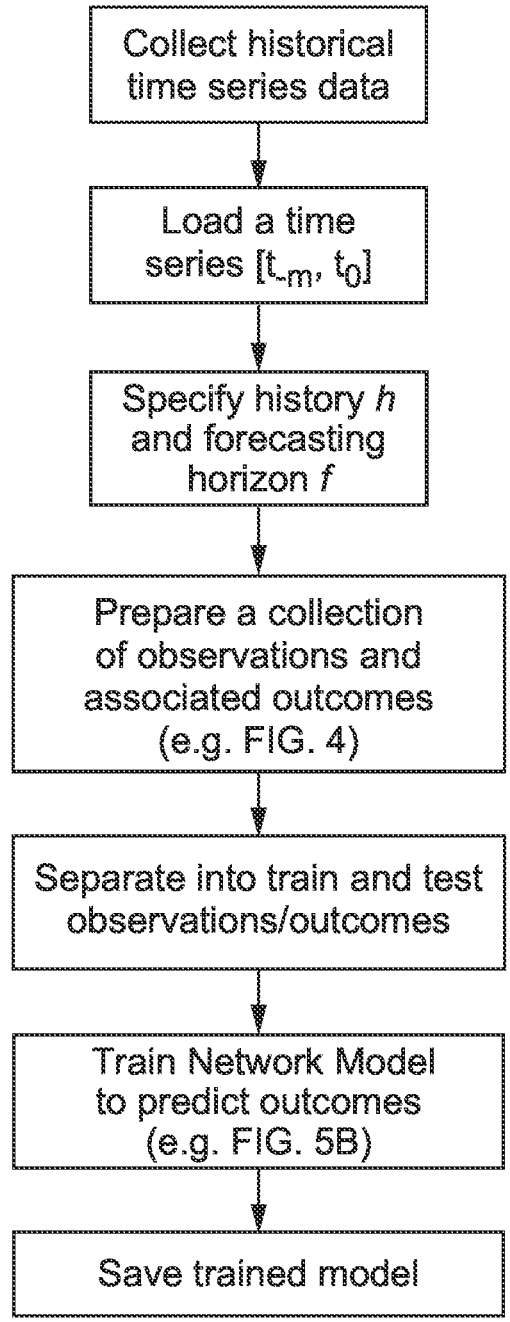
FIG. 15 is a flowchart illustrating data preparation and network training.

FIG. 15 is a flowchart illustrating data preparation and network training. Raw data from an industrial process is collected. This data includes the values of independent variables and one or more output variables at regular time intervals. The time points are indexed, as described above, to provide a times series $[t_{-m}d, t_0]$. A history length h and forecasting horizon f are selected. The data is then transformed into a collection of observations and associated outcomes, as described above. These observations are used to train a network model, by first inputting a training set of observations/outcomes, and then a testing set, which is used to fine-tune the network. The resulting trained network is saved, and ready to be used to analyze streaming data.

Figure 16:
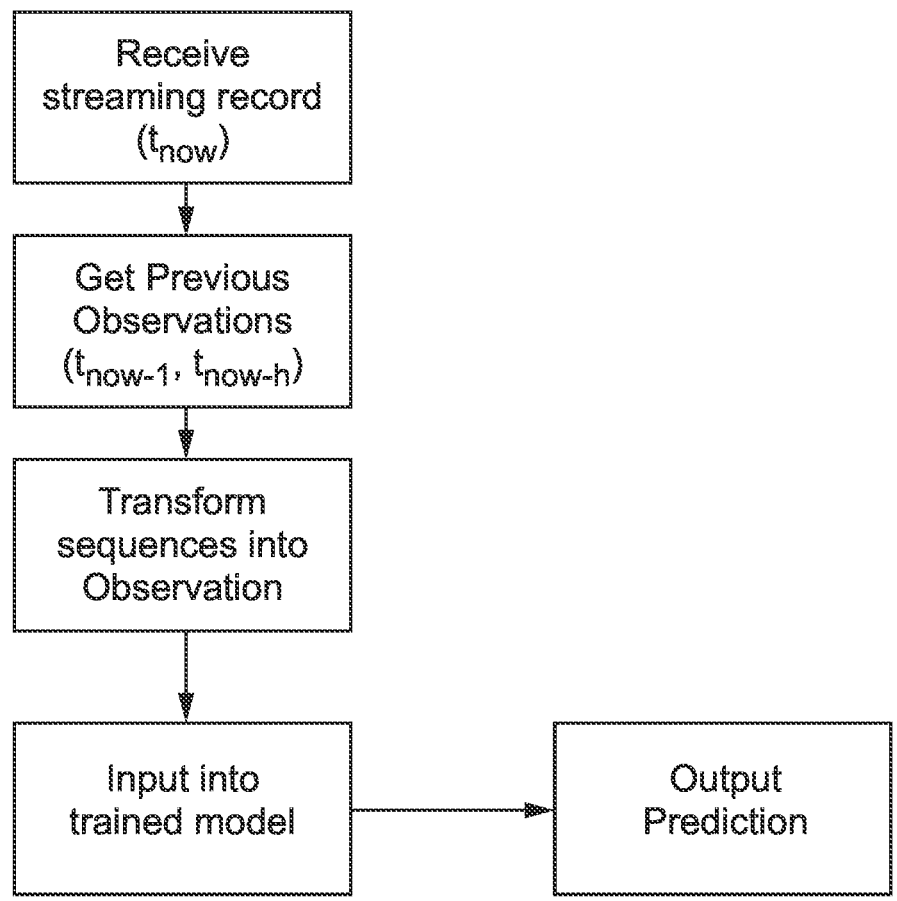
FIG. 16 is a flowchart illustrating prediction of output values based on streaming data.

FIG. 16 is a flowchart illustrating prediction of output values based on streaming data. Current streaming data is obtained. In order to prepare the data for use by the trained network, the streaming data must be transformed into a series of observations based on streaming data for time points spanning back according to the history length h. These are then input into the trained model, to provide an output in the forecasting horizon f.

Figure 17:
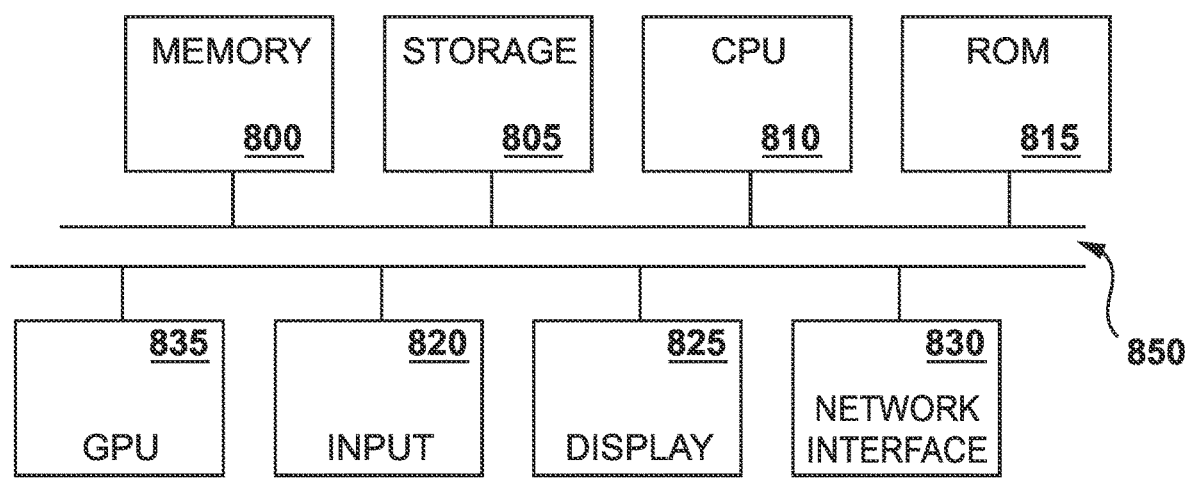
FIG. 17 illustrates a block diagram of an embodiment of a computing device.

FIG. 17 is a block diagram of a computing device which may be used to implement a method of an embodiment and perform the tasks of an apparatus of an embodiment. An example of a computing device includes a data storage server. The computing device comprises a computer processing unit (CPU) 810, memory 800, and storage 805. Optionally, the computing device may also include a network interface 830 for communication with other such computing devices of embodiments. For example, an embodiment may be composed of a network of such computing devices. Optionally, the computing device may also include Read Only Memory 815, one or more input mechanisms 820 and a display unit 825. The components are connectable to one another via a bus 850. In addition, the computing device may also include a graphical computing unit (GPU) (835) that helps to reduce the amount of time required to train the model The memory 800 may be, for example, a Random Access Memory; the storage may be, for example, a hard disk; the input may be, for example, one or more of a keyboard, mouse, touch screen; and the display unit may be, for example, one or more monitors.

The CPU 810 is configured to control the computing device and execute processing operations. The memory 800 stores data being read and written by the CPU 810. The storage unit 805 may be, for example, a non-volatile storage unit, and is configured to store data.

The display unit 825 may display a representation of data stored by the computing device and displays a cursor and dialog boxes and screens enabling interaction between a user and the programs and data stored on the computing device. The input mechanisms 820 enable a user to input data and instructions to the computing device.

The network interface 830 is connected to a network (e.g. the Internet) and is connectable to other such computing devices via the network. The network interface 830 controls data input/output from/to other apparatus via the network.

Other peripheral devices such as microphone, speakers, printer, power supply unit, fan, case, scanner, trackball etc may be included in the computing device.

The computing device illustrated in FIG. 17 is an example which may be used to carry out methods of the embodiments. Variations of the computing device shown in FIG. 17 include a subset of the components shown therein. A few non-limiting examples of arrangements and uses are described as follows. A method of an embodiment may be carried out by a single computing device in communication with one or more data storage servers via a network. The computing device may be a data storage itself storing at least a portion of the data. A method of an embodiment may be carried out by a plurality of computing devices operating in cooperation with one another. One or more of the plurality of computing devices may be a data storage server storing at least a portion of the data.

Embodiments may be implemented in hardware, or as software modules running on one or more processors, or on a combination thereof. That is, those skilled in the art will appreciate that a microprocessor or digital signal processor (DSP) may be used in practice to implement some or all of the functionality described above.

The embodiments may also be embodied as one or more device or apparatus programs (e.g. computer programs and computer program products) for carrying out part or all of the methods described herein. Such program embodiments may be stored on non-transitory computer-readable storage media, or could, for example, be in the form of one or more non-transitory signals. Such signals may be data signals downloadable from an Internet website, or provided on a carrier signal, or in any other form.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A computer-implemented method comprising:
one or more processors of a computer system executing training of a neural network using input comprising a plurality of observations of an industrial process implemented with industrial equipment, each observation comprising a time-indexed sequence of input values and an output value corresponding to the sequence of input values, the input values comprising at least one of a physical characteristic of an input to the industrial process or a chemical characteristic of an input to the industrial process, to thereby provide a trained neural network model;
the computer system subsequently receiving an input for generating a prediction of an output value for the industrial process, the input comprising at least one further sequence of input values; and
the one or more processors of the computer system applying the input for generating the prediction to the trained neural network model to generate the prediction of the output value,
wherein the neural network comprises a first convolutional layer, followed by one or more inception-module layers, followed by a recurrent layer and terminating with a dense layer, wherein each inception-module layer comprises an inception layer followed by a merging layer and a pooling layer.

2. The method of claim 1, wherein each inception layer comprises a plurality of convolutional layers and one or more merging layers.

3. The method of claim 2, wherein the plurality of convolutional layers include at least two convolutional layers in series as well as convolutional layers in parallel.

4. The method of claim 1, wherein the neural network comprises at least three inception-module layers.

5. The method of claim 2, wherein the plurality of convolution layers in the inception layer of a second inception-module layer comprises larger kernels than corresponding convolution layers of the plurality of convolution layers in the inception layer of a first inception-module layer.

6. The method of claim 5, wherein the plurality of convolution layers in the inception layer of a third inception-module layer comprises kernels of a same size as the corresponding convolution layers of the plurality of convolution layers in the inception layer of the first inception-module layer.

7. The method of claim 1, wherein the pooling layer of each inception-module layer is an average pooling layer.

8. The method of claim 1, wherein the recurrent layer is a gated recurrent unit.

9. The method of claim 1, wherein the neural network is a single neural network.

10. The method of claim 1, wherein the input values of the industrial process comprised in the observations and the input for generating the prediction comprise one or more of: ambient meteorological conditions, chemical makeup of input fuels, input rates, control parameters, operational parameters, or temperatures at different points of the industrial process.

11. A data processing apparatus configured to generate a prediction of an output value for an industrial process implemented with industrial equipment, comprising one or more processors configured to:
receive, as input, a sequence of input values for the industrial process;
apply the input to a trained neural network model to generate the prediction of the output value for the industrial process,
wherein the trained neural network model is provided by training a neural network comprising a first convolutional layer, followed by one or more inception-module layers, followed by a recurrent layer and terminating with a dense layer, wherein each inception-module layer comprises an inception layer followed by a merging layer and a pooling layer; and training data for the training comprises a plurality of observations of the industrial process, each observation comprising a time-indexed sequence of input values and an output value corresponding to the sequence of input values, the input values comprising at least one of a physical characteristic of an input to the industrial process or a chemical characteristic of an input to the industrial process.

12. The data processing apparatus of claim 11, wherein each inception layer comprises a plurality of convolution layers, and the plurality of convolutional layers include at least two convolutional layers in series as well as convolutional layers in parallel.

13. The data processing apparatus of claim 11, wherein each inception layer comprises a plurality of convolution layers, and the plurality of convolution layers in the inception layer of a second inception-module layer comprises larger kernels than corresponding convolution layers of the plurality of convolution layers in the inception layer of a first inception-module layer.

14. The data processing apparatus of claim 13, wherein the plurality of convolution layers in the inception layer of a third inception-module layer comprises kernels of a same size as the corresponding convolution layers of the plurality of convolution layers in the inception layer of the first inception-module layer.

15. The data processing apparatus of claim 11, wherein the trained neural network model is a single trained neural network model and the input values comprise at least one of a physical characteristic of an input to the industrial process or a chemical characteristic of an input to the industrial process.

16. A non-transitory computer-readable medium storing code which, when executed by one or more processes of a data processing apparatus, causes the apparatus to implement:

receiving, as input, a sequence of input values for an industrial process implemented with industrial equipment;

applying the input to a trained neural network model to generate the prediction of the output value for the industrial process, wherein the trained neural network model is provided by training a neural network comprising a first convolutional layer, followed by one or more inception-module layers, followed by a recurrent layer and terminating with a dense layer, wherein each inception-module layer comprises an inception layer followed by a merging layer and a pooling layer; and training data for the training comprises a plurality of observations of the industrial process, each observation comprising a time-indexed sequence of input values and an output value corresponding to the sequence of input values, the input values comprising at least one of a physical characteristic of an input to the industrial process or a chemical characteristic of an input to the industrial process.

17. The non-transitory computer-readable medium of claim 16, wherein each inception layer comprises a plurality of convolution layers, and the plurality of convolutional layers include at least two convolutional layers in series as well as convolutional layers in parallel.

18. The non-transitory computer-readable medium of claim 16, wherein the neural network is a single neural network.

* * * * *

UNITED STATES PATENT AND TRADEMARK OFFICE
CERTIFICATE OF CORRECTION

PATENT NO. : 11,294,367 B2
APPLICATION NO. : 16/230729
DATED : April 5, 2022
INVENTOR(S) : Steve Kludt and Amol Mane It is certified that error appears in the above-identified patent and that said Letters Patent is hereby corrected as shown below:

In the Specification

Column 6, Line 43, delete "they value" and insert therefor --the y value--;

Column 9, Line 31, delete "RAIN" and insert therefor --RNN--; and

Column 11, Line 38, delete "[$t_{-md}$, $t_0$]" and insert therefor --[$t_{-m}$, $t_0$]--.

Signed and Sealed this
Twenty-eighth Day of June, 2022

Katherine Kelly Vidal
*Director of the United States Patent and Trademark Office*